Dec. 22, 1931.    H. A. MEAD    1,837,825
OIL RETAINING DIP
Filed Sept. 24, 1928
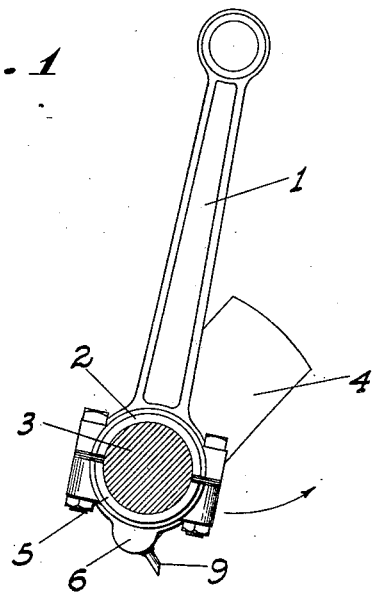
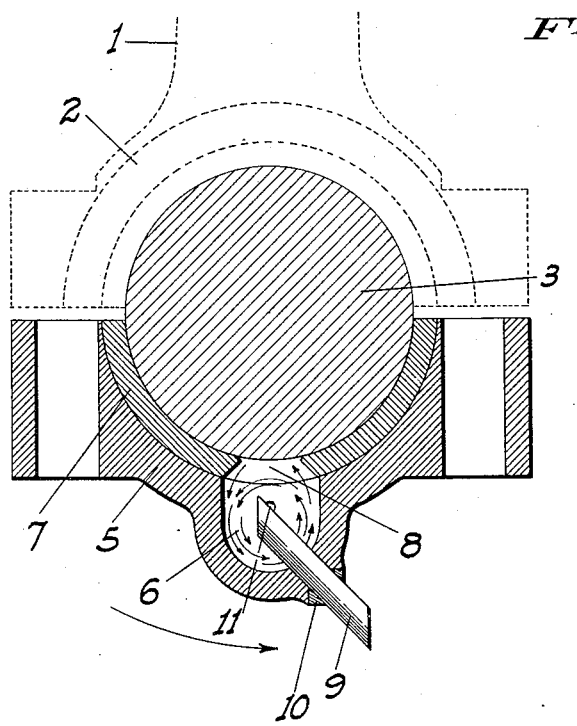
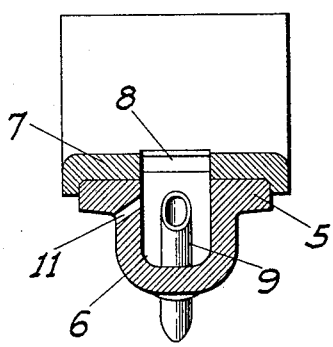
INVENTOR
H. A. Mead
BY *Perry S. Webster*
ATTORNEY Patented Dec. 22, 1931

1,837,825

UNITED STATES PATENT OFFICE

HOMER A. MEAD, OF TURLOCK, CALIFORNIA

OIL RETAINING DIP

Application filed September 24, 1928. Serial No. 307,996.

This invention relates to devices for lubricating the crank pins of the crank shafts of gas and similar engines and particularly to a device of that character which functions with the rotation of the crank shaft, or which operates on what is commonly known as the splash feed system.

Essentially such devices comprise oil pick-up means or dips which are assumed to pick up a certain amount of oil from the crank case sump with each downward movement of the connecting rod, and convey such oil to the crank pin.

As such dips are now ordinarily constructed, however, very little oil can ever reach the pin since no means is provided for retaining any amount of oil adjacent the pin. Also the oil drawn up into the dip passage during the very short portion of movement of the connecting rod in one direction is more than likely to be thrown out of the passage during the remaining and much larger portion of the cycle of movement of the rod when the dip is not in contact with the oil in the reservoir. This of course is owing to the centrifugal action set up by the rapidly oscillating rod.

Also the fact that the oil dip passages are substantially air-tight at their inner ends, prevents the free flow of oil through such passages from the outer end to the crank pin as will be evident. As a result the crank pin is inefficiently lubricated.

The principal object of my invention is to eliminate these objectionable and defective features by providing an oil dip structure on the connecting rod cap so constructed that a certain amount of oil will be positively retained adjacent the crank pin at all times, regardless of the movement of the parts; and the oil pick-up by the movement of the connecting rod can freely flow to the oil retaining pocket of the cap. At the same time the oil thus accumulated and not actually used by the crank pin bearing is constantly agitated and circulated back to the crank case with the operation of the engine. This avoids the possibility of the pin bearing becoming finally inefficiently lubricated due to the thinning of the oil if used over and over and not changed.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of a connecting rod and the improved oil dip cap mounted thereon in connection with a crank shaft.

Fig. 2 is a transverse section of the cap associated with a connecting rod and crank pin.

Fig. 3 is a longitudinal section of the cap detached.

Referring now more particularly to the characters of reference on the drawings, the numeral 1 denotes the standard gas engine connecting rod provided on its lower end with a head 2 to engage the crank pin 3 of the crank shaft 4; a cap 5 of special form cooperating with the head 2 to also engage the crank as usual.

Formed in the cap and depending from the bottom thereof is a relatively small oil retaining pocket 6 preferably of circular contour at the bottom on an axis parallel to the crank shaft. The pocket communicates with the bore of the cap, the usual bearing bushing 7 in the cap and directly engaging the crank pin having a slot 8 cut therethrough to provide communication between the pocket and the adjacent surface of the pin.

Projecting upwardly into the pocket from below and disposed at a suitable angle to the longitudinal axis of the connecting rod is a smooth bore tube 9, open on both ends and facing at its lower end in the direction or rotation of the crank shaft when on its downward stroke, or so that said tube will pick up oil from the crank case sump of the engine with such rotation of the crank shaft.

For convenience of manufacture the tube is made as a separate part from the cap and is welded or brazed in place as indicated at 10. The tube projects upwardly into the pocket 6 a sufficient distance so that its lower edge clears the bottom of the pocket to the extent necessary to prevent oil draining back through the tube unless a considerable supply has accumulated in the pocket. A small hole 11 is drilled through one side of the pocket to the exterior of the same, the inner end of such hole being positioned substantially midway of the width and height from the crank pin to the bottom of the pocket. This hole serves an important purpose. In the first place it provides an air relief outlet enabling air to be displaced from the pocket as the oil is forced up through the tube and thus permitting such oil to freely flow into the pocket without any back pressure due to the presence of confined air being had. In the second place, this hole provides for the overflow of oil from the pocket in the event that an excessive amount is fed in, and thus enabling the oil to be constantly changed while the engine is in operation and preventing interference with the continued inflow of fresh oil into the retaining part.

As the connecting rod reciprocates and its lower end rotates about a fixed axis (the crank shaft) the oil in the pocket will be thrown against the walls of the same and caused to be whirled about due to the action of centrifugal force set up with the movement of the crank shaft, and such oil during such whirling movement will come in contact with and lubricate the surface of the crank pin exposed through the slot 8. The circular shape of the pocket at the bottom aids in permitting the oil to thus freely whirl about. Due to the location of the inner end of the escape hole 11, the whirling oil is maintained clear of the hole so as not to be drawn therethrough unless the pocket is practically full and some oil passes across the hole during its whirling motion.

Such excess oil will then drain back to the crank case, relieving the pocket of its overfull condition, and allowing new oil to be fed into the pocket through the dip 2. While the escape hole 11 is thus covered or full of the excess oil it is of course temporarily prevented from functioning as an air-relieving hole. When the pocket is so full that the oil thus covers the hole however, no more oil is needed in the pocket for the time being and it is therefore immaterial whether the oil can then flow up the dip tube or not.

From the foregoing description it will readily be seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a connecting rod cap, an oil retaining pocket formed therein and communicating freely with the crank pin bearing surface of the cap, and means for enabling oil to be fed into the pocket with the movement of the connecting rod, there being an opening from the pocket separate from the oil feeding means to permit of the escape of air from the pocket.

2. In a connecting rod cap, an oil retaining pocket formed therein and communicating freely with the crank pin bearing surface of the cap, and means for enabling oil to be fed into the pocket with the movement of the connecting rod, there being an opening from the pocket separate from the oil feeding means positioned to permit of the escape of air from the pocket but preventing the escape of oil unless an excessive amount is present in said pocket.

3. In a connecting rod cap, an oil retaining pocket formed therein and communicating freely with the crank pin bearing surface of the cap and an oil-dip passage member open on both ends leading from the exterior to the interior of the pocket and terminating in said pocket some distance above the bottom thereof.

4. In a connecting rod cap, passage means provided with the cap and communicating with the crank-pin bearing surface thereof, said means including an oil-dip member leading from below the cap; there being an air relief opening provided from said passage means to the exterior toward the inner end thereof.

5. In a connecting rod cap an oil retaining pocket formed therein and communicating freely with the crank-pin bearing surface thereof, and an oil dip passage member open on both ends projecting upwardly into the pocket from below the same, and terminating therein in spaced relation to the bottom and sides of said pocket.

6. In a connecting rod cap an oil retaining pocket formed therein and communicating freely with the crank-pin bearing surface thereof, the bottom surface of the pocket being substantially semicircular in form with its axis parallel to the axis of the cap, and an oil-dip member extending from the exterior to the interior of the pocket substantially radial with the axis of the same and terminating in an opening located in a plane adjacent that of said axis.

7. In a connecting rod cap an oil retaining pocket formed therein and communicating freely with the crank-pin bearing surface thereof, the bottom surface of the pocket being substantially semicircular in form with its axis parallel to the axis of the cap, and an oil-dip member extending from the exterior to the interior of the pocket; said pocket having an air relief opening from one side located adjacent the plane of the axis of the curved portion of the pocket.

In testimony whereof I affix my signature.

HOMER A. MEAD.